Jan. 14, 1964  H. P. KOPPEHELE  3,117,342
FILM EXTRUSION APPARATUS
Filed March 7, 1961
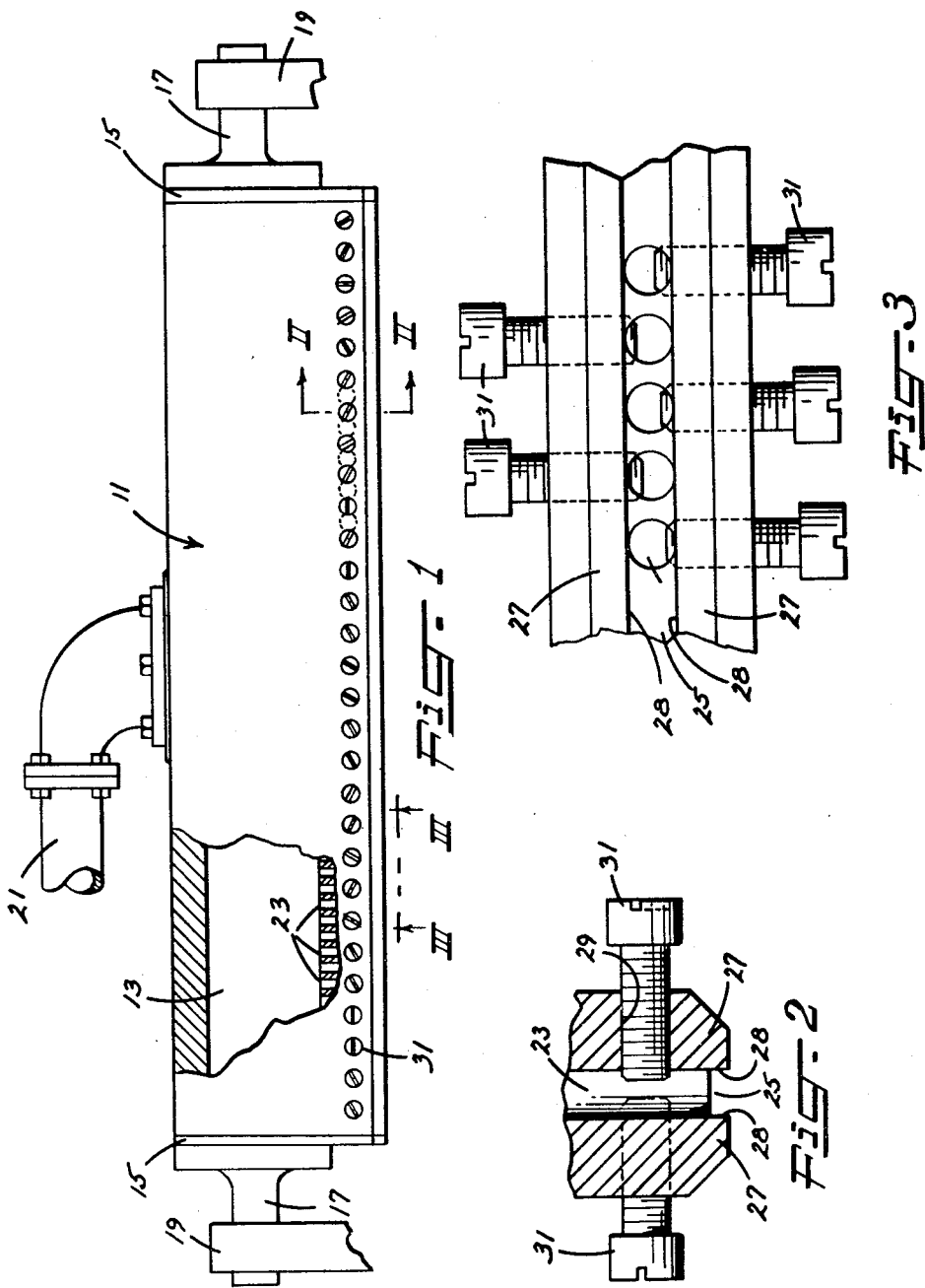

United States Patent Office 3,117,342
Patented Jan. 14, 1964

3,117,342
FILM EXTRUSION APPARATUS
Hugo Paul Koppehele, Glen Riddle, Pa., assignor, by mesne assignments, to FMC Corporation, San Jose, Calif., a corporation of Delaware
Filed Mar. 7, 1961, Ser. No. 93,969
3 Claims. (Cl. 18—12)

The invention relates to the production of films or sheets and more particularly to an apparatus for making films of improved gauge.

In the manufacture of films formed of thermoplastic polymeric materials, for example, molten polymeric material is forced from a nozzle cavity through an extrusion orifice formed between a pair of blades or lips which together shape the polymeric material into a film. As the shaped polymeric material leaves the nozzle, it is drawn-down and then quenched so that some orientation of the polymer molecules occurs during the extrusion process.

With a nozzle in which the blades are equally spaced along their entire length and which provides for ideal flow rates at every point along the length of the extrusion orifice, the film produced under a fixed set of extrusion and quenching conditions and a fixed drawn-down velocity $V_f$, will be of a particular gauge G. As the polymeric material leaves the extrusion orifice of such nozzle, it is relieved of the extrusion pressure and expands due to its memory effect. At this stage the shaped polymeric material is traveling at an initial velocity of $V_i$, so that the degree to which the shaped film is drawn before being fully quenched, expressed as the draw ratio DR, would be equal to $$\frac{V_f}{V_i}$$

Increasing the spacing between the blades of the above described nozzle would reduce the initial velocity $V_i$ of the polymeric material extruded from the orifice. The draw ratio, however, would be increased so that the film gauge G would remain constant. Conversely, decreasing the spacing between the nozzle blades would increase the initial velocity $V_i$ of the extruded polymeric material, so that the draw ratio would decrease and again the film gauge G would remain the same. Thus, in this ideal situation a change in the spacing between the nozzle blades is evidenced by a change in the draw ratio so that the primary effect is only on the molecular flow orientation achieved in the final film.

Under actual operating conditions with conventional extrusion nozzles, however, the flow rate of the polymeric material differs along the length of the extrusion orifice. These differential flow rates are attributed to a variety of factors, such as the manner in which the polymeric material is delivered to the extrusion orifice, temperature differentials along the length of the extrusion blades, fabrication tolerances, etc. To compensate for these differences in the flow rate of the polymeric material along the orifice length, adjusting mechanisms are provided for flexing one of the nozzle blades and thereby vary the spacing between the blades at different points along their lengths. The blades of conventional nozzle constructions, however, are relatively massive to insure that they possess the desired rigidity under the extrusion pressure so that spacing the blade adjusting means less than about two inches apart does not generally provide for any improved control over the blade flexing characteristics.

With a conventional nozzle as described above, it will be apparent that adjusting the nozzle blades so as to space the same more closely along one section of the extrusion orifice than at others would require that the polymeric material passing through such narrowed section be under a higher pressure to maintain a given flow rate along the entire length of the extrusion orifice. Alternatively, such given flow rate could be achieved by applying less pressure to those portions of the polymeric material which flow through the wider sections of the extrusion orifice. Unfortunately, only one extrusion pressure can be developed on the polymeric material with conventional nozzle constructions so that a redistribution of the flow of the polymeric material must occur within the nozzle cavity and behind the nozzle blades. Thus, decreasing the spacing between the blades at one section of the extrusion orifice of a conventional nozzle reduces the initial velocity of the polymeric material issuing from that section. However, since the entire width of the quenched film is advanced at substantially the same draw-down velocity, that portion of shaped polymeric material issuing from the narrowed section of the extrusion orifice will be subjected to a greater draw-down and will therefore be of less thickness than other parts of the film. Conversely, the polymeric material flowing through the wider sections of the extrusion orifice will travel at an increased initial velocity so that the draw ratio of those portions of the film will be reduced, causing such film sections to be of increased thickness.

Basically then, with conventional nozzle structures the flow rate of the polymeric material is varied along different points of the extrusion orifice in an attempt to provide a flow rate which is approximately the same along the entire length of the extrusion orifice. This adjusting procedure is not only tedious and time-consuming but is further handicapped by the flexing characteristics of the orifice defining blades themselves. As heretofore mentioned, these blades are necessarily of massive construction and thus respond to adjustments by bowing along a substantial portion of their lengths rather than flexing at desired points. Accordingly, a primary object of this invention is to provide a new or generally improved and more satisfactory film extrusion apparatus.

Another object is to provide a film extrusion apparatus which affords better and more accurate control over the gauge of the shaped film-forming material as it is extruded therefrom.

Still another object is the provision of an apparatus in which a plurality of streams of film-forming material are simultaneously extruded in side-by-side relationship and then blended into a smooth surfaced unitary film.

A further object is to provide an apparatus for extruding, under pressure, a plurality of individual streams of film-forming material through independently valved orifices positioned in side-by-side relationship, and including means which engage with the streams as they expand upon being extruded for blending the same into a unitary film.

These and other objects and advantages of the invention will be apparent from the following description and accompanying drawing in which:

FIGURE 1 is a front view of the film extrusion nozzle of the present invention, with a portion thereof being broken away;

FIGURE 2 is a transverse vertical section taken along the line of II—II of FIGURE 1; and FIGURE 3 is a view of a portion of the bottom or exit of the nozzle of the present invention as seen along the lines III—III of FIGURE 1.

In general, the present invention is directed to an apparatus for making films or sheets having improved gauge characteristics by extruding, under pressure, a plurality of streams of film-forming material in side-by-side relationship, with the memory effect or inherent tendency for the film-forming material to expand after being extruded, being harnessed to blend the extruded streams of film-forming material into a unitary film of desired and substantially uniform gauge.

Broadly, the apparatus of the present invention includes a housing having a chamber which opens into a series of closely spaced and aligned extrusion orifices, each of which is provided with an independent valve for controlling the rate of flow of the film-forming material therethrough. At their exit ends, the extrusion orifices open into an elongated recess defined by a pair of smooth surfaced members which are engaged by the streams of film-forming material as they expand upon being extruded so as to thereby be blended together into a smooth surfaced film.

The apparatus of the present invention is hereafter described as being employed in the manufacture of films or sheets formed of plastic or fusible film-forming materials, and more specifically films formed of polymeric materials, such as ethylene or propylene. The teachings of the present invention are, of course, applicable to the forming of films from a variety of different materials which are capable of being rendered plastic or molten for extruding the same.

Referring to the accompanying drawing, the extrusion nozzle of the present invention includes a main housing 11 having a cavity or chamber 13 which is closed at its ends by plates 15. Trunnions 17 project from the ends of the housing 11 and are received within bearings 19 for supporting the nozzle for swinging movement to and from operating position.

A conduit 21 delivers molten polymeric material, under pressure, into the nozzle cavity 13 within which it distributes itself and substantially fills the same. From the cavity 13, the molten polymeric material flows through a series of extrusion orifices 23 which are disposed in closely spaced, side-by-side relationship, along a plane extending longitudinally of the nozzle. The orifices 23 open into an elongated recess or slot 25 which is defined by lips 27, each having a smooth wall surface 28. Threaded openings 29 are formed in the opposite side walls of the housing 11 and receive bolts or valves 31 which are adapted to extend into and across the respective extrusion orifices 23 for individually controlling the flow of the molten polymeric material therethrough. As illustrated, the valves 31 for adjacent extrusion orifices 23 are positioned along opposite sides of the nozzle housing to facilitate easier access and adjustment thereof.

In the operation of the above described nozzle, molten polymeric material is delivered into the cavity 13 and is extruded through the series of orifices 23 as a plurality of individual streams, each flowing at substantially the same rate. As the streams of molten polymeric material enter the recess 25, they are relieved of the extrusion presures and thus expand to assume a state of equilibrium. With the nozzle structure illustrated, the extruded streams are free to expand diametrically toward each other so as to cause adjacent streams to merge and blend with each other. Expansion of the individual extruded streams of polymeric material along directions extending generally transversely of the recess 25, however, is restricted by the lips 27. These expansive influences are thus deflected by the lips 27 so as to accentuate the blending of the extruded streams. As the streams of polymeric material merge to provide a unitary flow, the lip surfaces 28 assist in blending the polymeric material into the valleys which form between adjacent streams so that opposite surfaces of the shaped film issuing from the nozzle are smooth and substantially parallel with each other. Outwardly of the nozzle the shaped film is drawn-down by a rapid take-up means and then quenched or set, as in conventional film-extrusion processes.

If it is desired to vary the rate of flow of the molten polymeric material at certain points along the nozzle, as for example to compensate for temperature differentials along the nozzle length, it is necessary to adjust only selected of the valves 31. Such adjustment can be effected during actual extrusion operations, and since the extrusion orifices are spaced closely to each other it is possible to accurately confine the effect of such adjustment to only that portion of the polymeric material being extruded through selected areas of the nozzle.

While the nozzle of the present invention is illustrated and described as including a unitary housing which is machined to provide the extrusion orifices 23 and lips 27, it will of course be understood that the extrusion orifices 23 may be formed in a separate block which could then be releasably attached to the housing. Similarly, the lips 27 may be formed as independent units adjustably mounted onto the nozzle housing. Regardless of whether the nozzle is of unitary or sectional construction, it is emphasized that the lip surfaces 28 serve merely to blend and smooth the adjacent extruded streams of polymeric material with each other as the streams themselves expand into contact therewith. In effect, the lip surfaces 28 harness the expansive forces acting the extruded streams of polymeric material by guiding the same along desired paths without themselves exerting such pressure on the polymeric material as would result in a further expansion thereof as it leaves the nozzle.

While the size, spacing and/or shape of the orifices 23 may be varied, as for example to adapt the apparatus for different operating conditions or polymeric materials, it will be understood that variation of those factors must be controlled so that the streams of polymeric material extruded therefrom merge and are blended into a smooth surfaced film as a result of their expansion.

In nozzle constructions wherein the recess 25 is defined by a pair of independent blades or lips 27, one or both of such blades may be adjustably mounted to permit the recess 25 to be compensated for any differences in expansion which may be exhibited by different polymeric materials. If desired, opposing and aligned shallow slots may be formed along the opposing lip surfaces 28 to provide the finished film with ribbed or corrugated surfaces. Alternatively, slots may be provided in the lip surfaces 28 only at the terminal portions of the recess 25 so that extruded film is formed with enlarged or beaded longitudinal edges which better adapt the same for subsequent stretching operations. In lieu of this procedure, beaded portions may be formed along the longitudinal edges of the shaped film by providing the above described nozzle with end plates of a construction as set forth in the U.S. patent application of McDermott et al., Serial Number 37,463 filed on June 20, 1960, and now U.S. Patent 3,072,962.

It is to be understood that changes and variations may be made without departing from the spirit and scope of the invention as defined in the appended claims.

I claim:

1. Film extrusion apparatus including means for delivering a flowable film-forming material, an extrusion block having a series of closely spaced orifices for shaping the delivered film-forming material under pressure into a plurality of individual streams disposed in side-by-side relationship, means for independently controlling the flow of film-forming material through the individual orifices, and means defining an outlet from the apparatus positioned to be engaged by the plurality of streams of film-forming material as they expand upon leaving said extrusion orifices and thereby become blended together into a single flat stream having smooth opposite surfaces.

2. Film extrusion apparatus including means for delivering a flowable film-forming material, an extrusion block having a series of closely spaced orifices for shaping the delivered film-forming material under pressure into a plurality of individual streams disposed in side-by-side relationship, a valve for each of said orifices for individually controlling the flow of film-forming material therethrough, and a pair of spaced elongated blades defining an outlet from the apparatus, said blades having opposing smooth surfaces for engaging with the streams of film-forming material as they expand upon being extruded from said block whereby the streams are blended with each other to provide a unitary flat stream having smooth opposite surfaces.

3. A film extrusion apparatus including a housing having an elongated chamber, means for delivering a flowable film-forming material into said chamber, means defining a plurality of closely spaced orifices extending from said chamber and opening into an elongated recess having opposing smooth wall surfaces, a series of bolts threaded into said housing and adapted to project into said orifices at substantially right angles to the axes thereof for individually controlling the flow of film-forming material therethrough, said opposing wall surfaces of said recess defining an outlet from the apparatus and being spaced so as to be engaged by the streams of film-forming material as they expand upon being extruded whereby the extruded streams are blended together to provide a unitary flat stream of film-forming material having smooth opposite surfaces, and means for setting the unitary flat stream of film-forming material as it issues from said recess.

References Cited in the file of this patent

UNITED STATES PATENTS

| | | |
|---|---|---|
| 2,061,042 | Parkhurst | Nov. 17, 1936 |
| 2,734,224 | Winstead | Feb. 14, 1956 |
| 2,897,541 | Orsini | Aug. 4, 1959 |
| 2,901,770 | Beck | Sept. 1, 1959 |